May 28, 1935.  E. S. HINELINE  2,003,190
APPARATUS FOR MAKING CONTACT PRINTS OR ENLARGEMENTS FROM DEVELOPED NEGATIVES
Filed Dec. 6, 1933   8 Sheets-Sheet 1
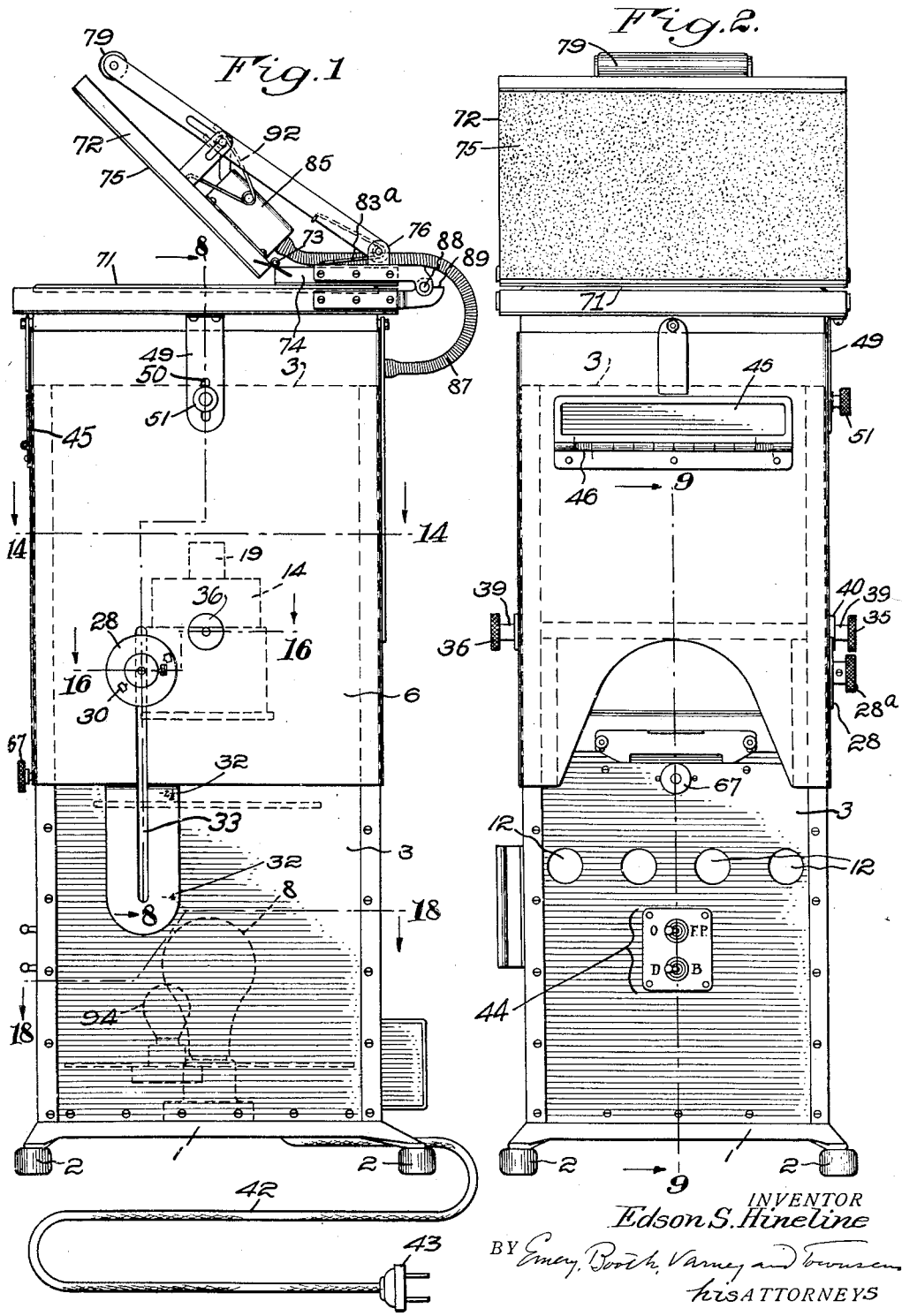

May 28, 1935.  E. S. HINELINE  2,003,190
APPARATUS FOR MAKING CONTACT PRINTS OR ENLARGEMENTS FROM DEVELOPED NEGATIVES
Filed Dec. 6, 1933   8 Sheets-Sheet 2
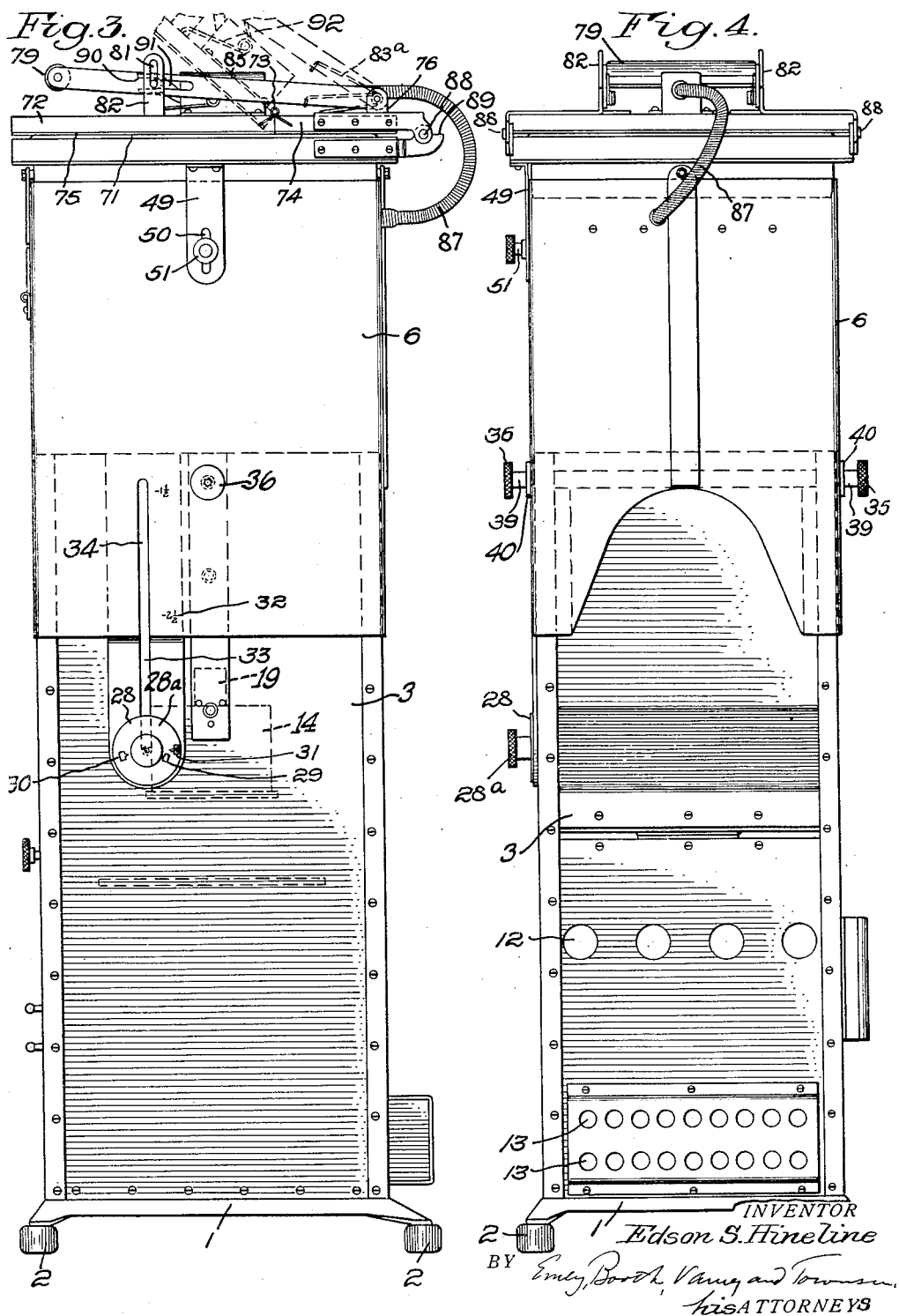
INVENTOR
Edson S. Hineline
BY Emery, Booth, Varney and Townsend
his ATTORNEYS May 28, 1935.  E. S. HINELINE  2,003,190
APPARATUS FOR MAKING CONTACT PRINTS OR ENLARGEMENTS FROM DEVELOPED NEGATIVES
Filed Dec. 6, 1933   8 Sheets-Sheet 3
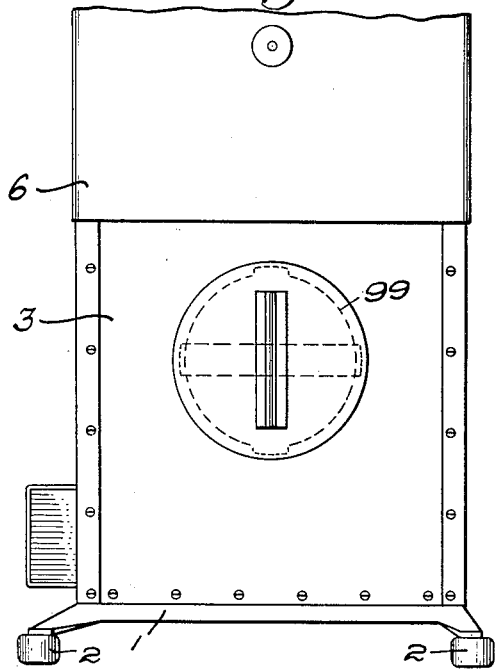
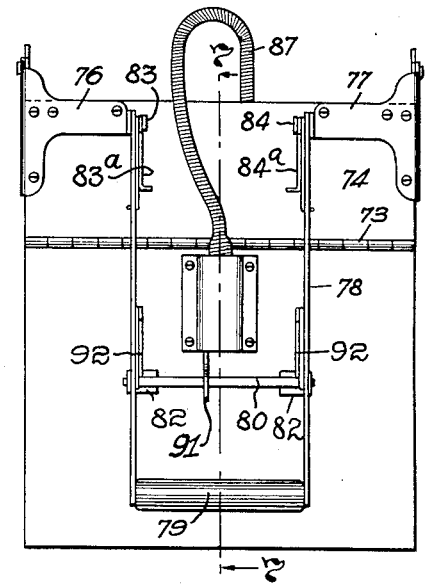
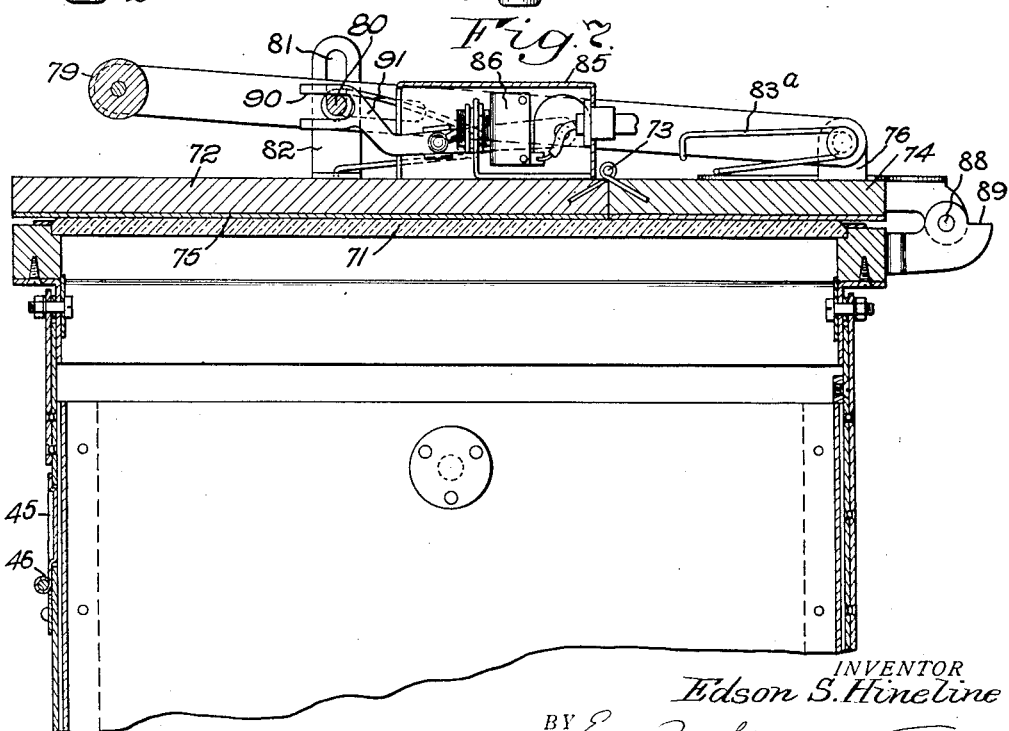
INVENTOR
Edson S. Hineline
BY
his ATTORNEYS

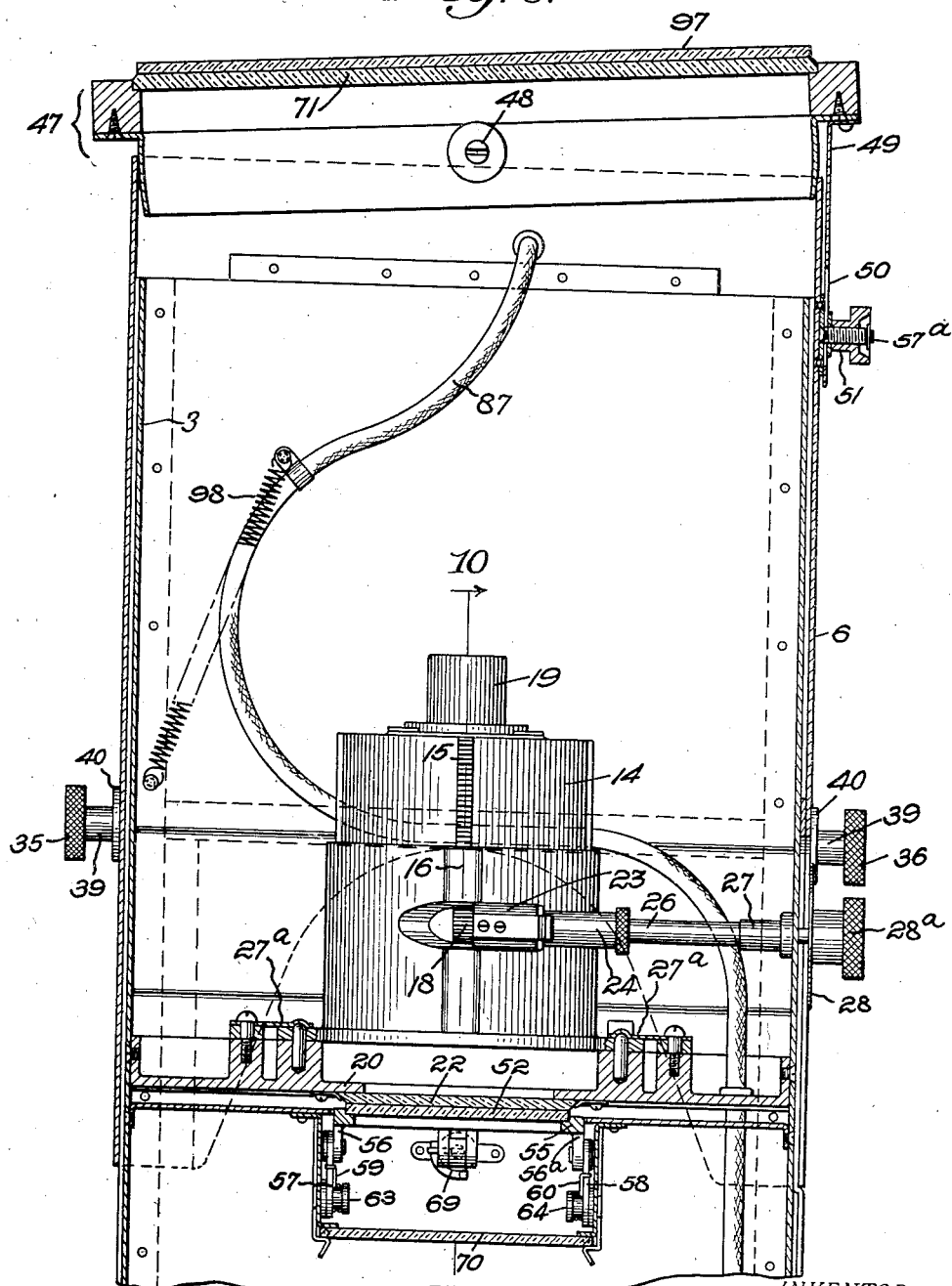

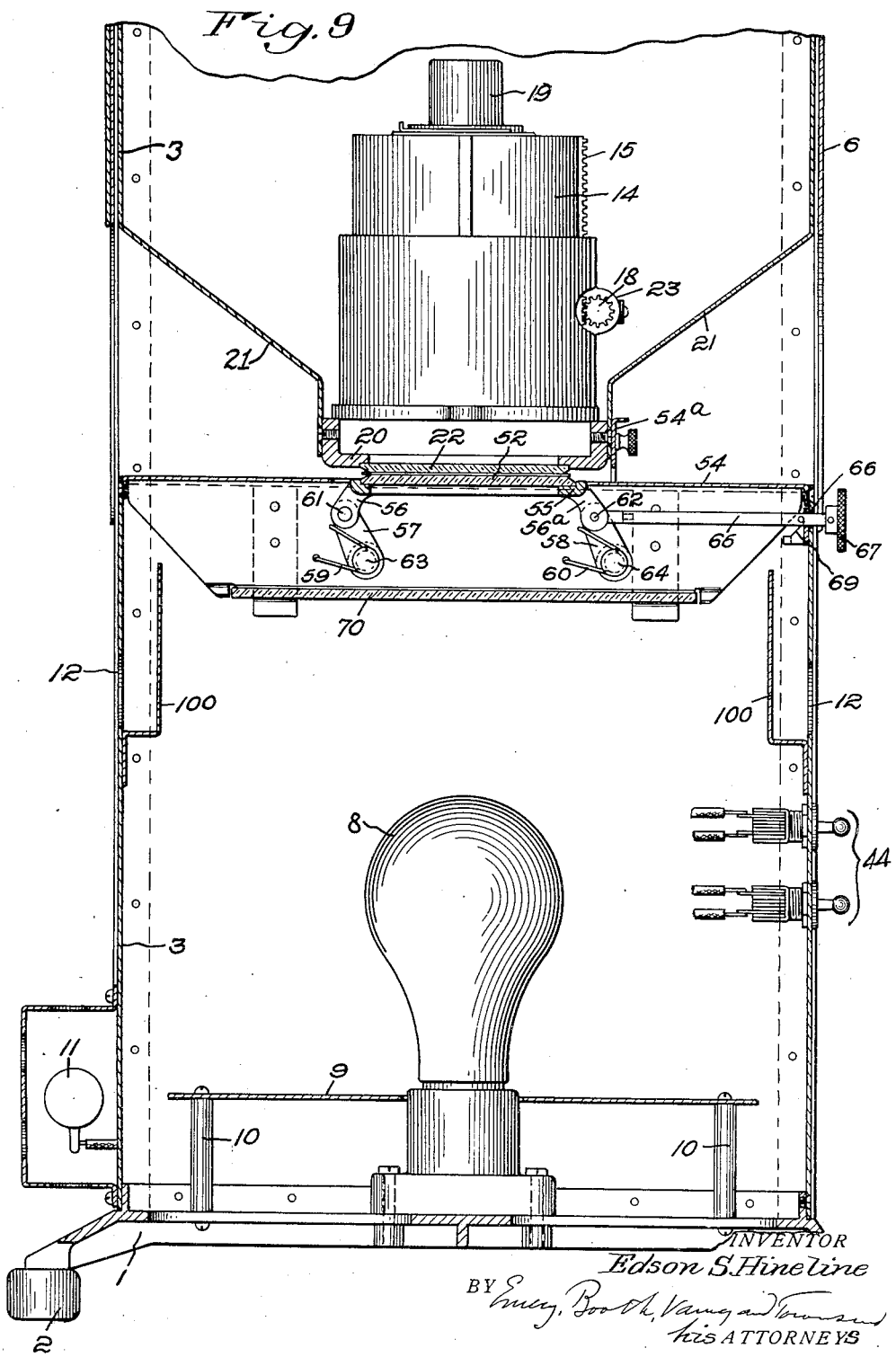

May 28, 1935. E. S. HINELINE 2,003,190
APPARATUS FOR MAKING CONTACT PRINTS OR ENLARGEMENTS FROM DEVELOPED NEGATIVES
Filed Dec. 6, 1933 8 Sheets-Sheet 6
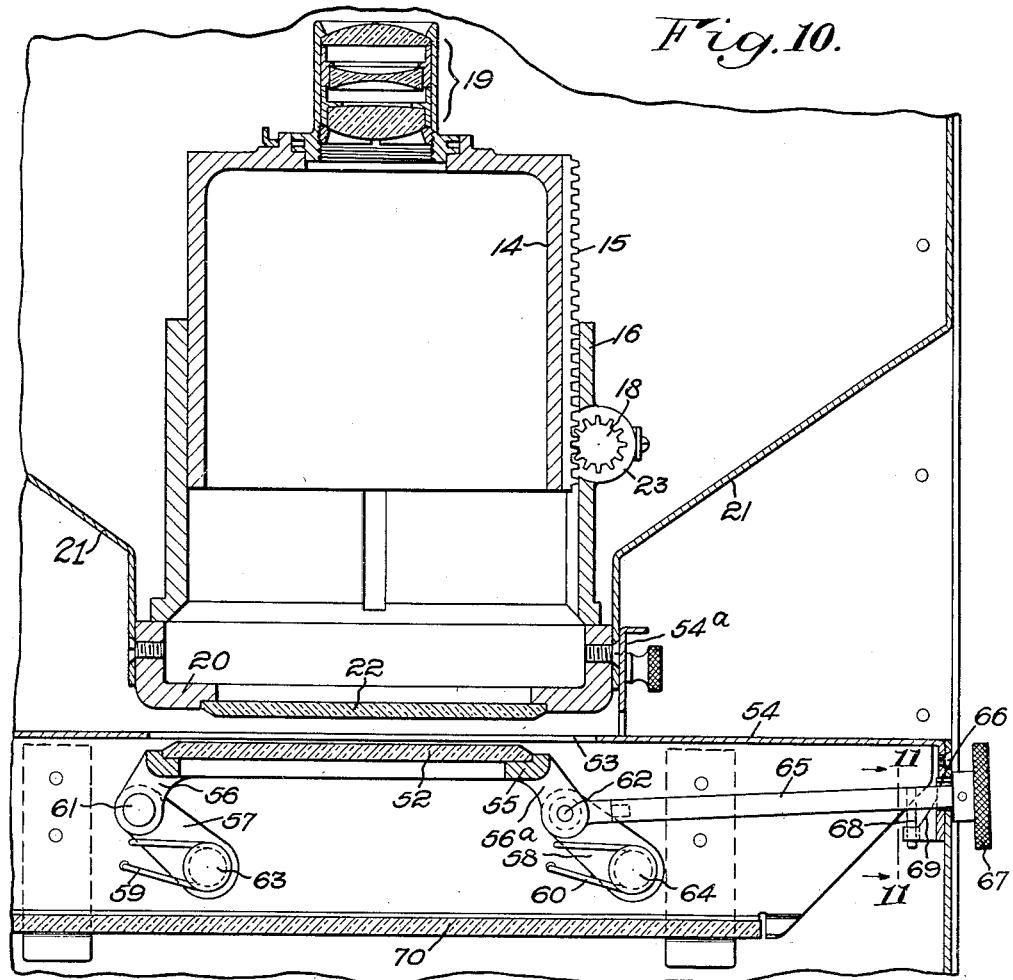
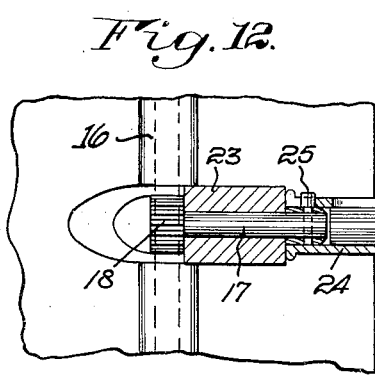
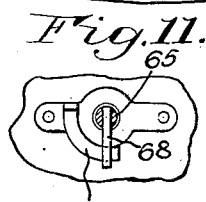
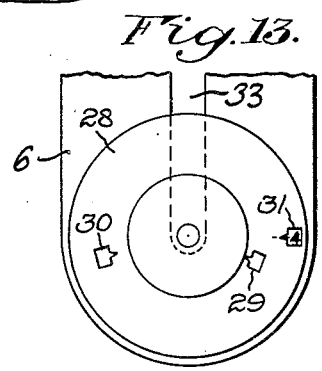
INVENTOR
Edson S. Hineline
BY *Emery, Booth, Varney and Townsend*
his ATTORNEYS

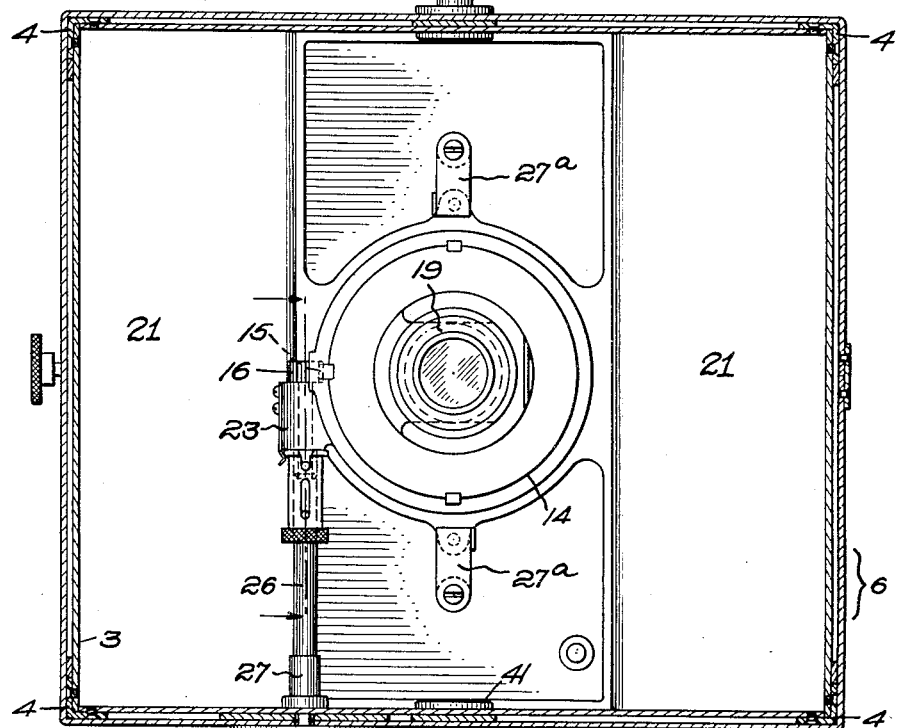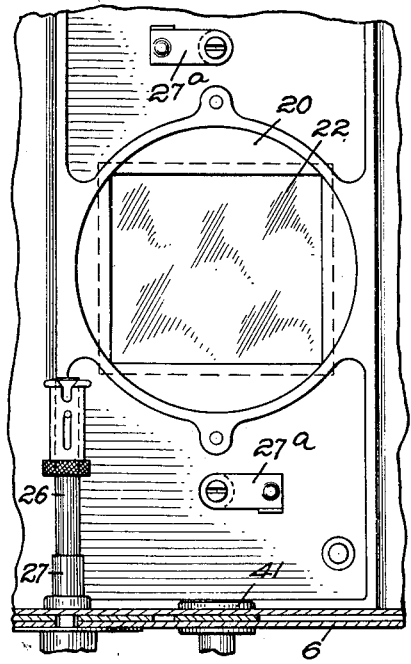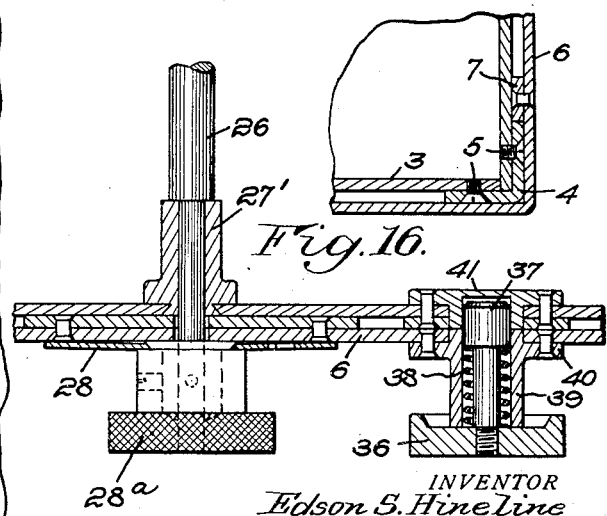

May 28, 1935.  E. S. HINELINE  2,003,190
APPARATUS FOR MAKING CONTACT PRINTS OR ENLARGEMENTS FROM DEVELOPED NEGATIVES
Filed Dec. 6, 1933    8 Sheets-Sheet 8
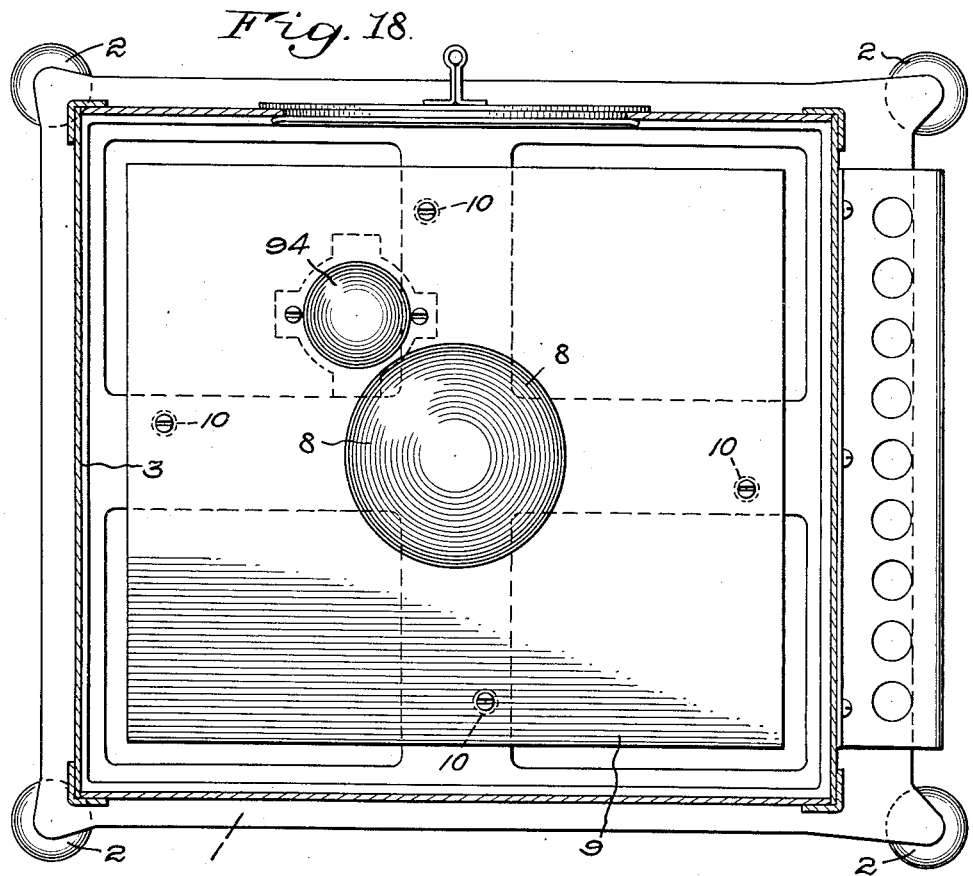
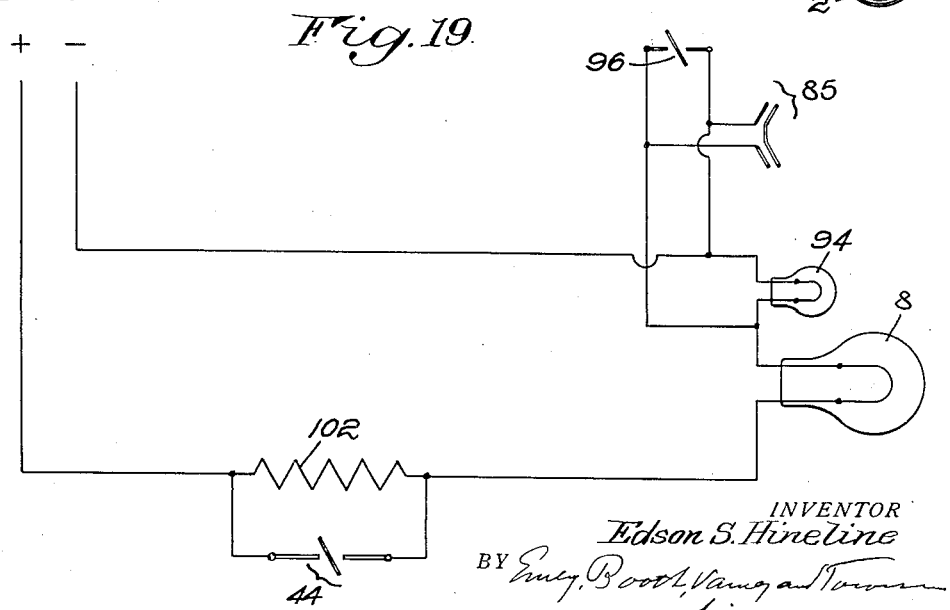
INVENTOR
Edson S. Hineline
BY
his ATTORNEYS Patented May 28, 1935

2,003,190

UNITED STATES PATENT OFFICE 2,003,190

APPARATUS FOR MAKING CONTACT PRINTS OR ENLARGEMENTS FROM DEVELOPED NEGATIVES

Edson S. Hineline, Rochester, N. Y., assignor to Folmer Graflex Corporation, Rochester, N. Y., a corporation of Delaware Application December 6, 1933, Serial No. 701,127

48 Claims. (Cl. 88—24)

This invention relates to self-contained, complete apparatus for making either contact prints or enlargements, from developed negatives of any character.

In order that the principle of the invention may be readily understood, I have disclosed a single embodiment thereof in the accompanying drawings, wherein—

Fig. 1 is a side elevation of the complete apparatus with the parts in position for making an enlargement one and a half times the size of the negative;

Fig. 2 is a front elevation of the apparatus shown in Fig. 1, with the parts in the same position;

Fig. 3 is a side elevation of the said apparatus but with the enlarger extended to a position giving a four times enlargement, the platen being shown as closed and the automatic switch in the "on" position in full lines;

Fig. 4 is a rear elevation of the apparatus with the parts in the position shown in Fig. 3;

Fig. 5 is a view of the lower part of the apparatus only, viewed from the side opposite Fig. 3;

Fig. 6 is a top or plan view of the apparatus with the platen in the position shown in Fig. 3;

Fig. 7 is a section upon an enlarged scale on the line 7—7 of Fig. 6 looking toward the left in said figure;

Fig. 8 is a vertical sectional view upon an enlarged scale on the irregular line 8—8 of Fig. 1 looking toward the right in said figure;

Fig. 9 is a vertical section on the line 9—9, Fig. 2, showing the lower portion of the apparatus, the parts being broken away below the top thereof;

Fig. 10 is a vertical section at right angles to Fig. 8, the top and the bottom portion of the apparatus being broken away, the left hand side of the apparatus also being broken away in order that the remaining parts may be shown on an enlarged scale;

Fig. 11 is a detail in section on the line 11—11, Fig. 10, showing the cam for the pressure pad lever;

Fig. 12 is a detail in section through a part of the focusing device, to indicate on a larger scale the means for disconnecting the parts when the lens barrel is to be removed, so that the apparatus can be used as a contact printer;

Fig. 13 is a detail in elevation of the dial for indicating or determining the correct positions of the lens barrel and other parts of the apparatus;

Fig. 14 is a horizontal section on the line 14—14 of Fig. 1 to show the construction and relation of the telescoping parts;

Fig. 15 is a detail, with parts broken away, in top plan view, the apparatus being in condition for contact printing only;

Fig. 16 is a detail in horizontal section on the line 16—16 of Fig. 1 showing the focusing shaft assembly and immediately related parts;

Fig. 17 is a much enlarged detail in horizontal section of one of the corners of the frame or body of the apparatus, and indicating how the parts are guided in the telescoping movements;

Fig. 18 is a horizontal section on the line 18—18, Fig. 1, looking downward in that figure; and Fig. 19 is an electric circuit diagram indicating the wiring arrangement of the apparatus.

An important purpose of my invention is to provide a complete or a self-contained apparatus to be used by photographers for making prints from negatives of any sort, whether glass or film, the apparatus being readily and very accurately adjustable so that it may be used either as a so-called printing machine making contact prints or for making enlargements which may be of any one of a series of different sizes relative to the size of the negative.

As hereinafter more fully set forth in detail, I have provided an apparatus constituting in combination a projection printer and a contact printer, with means whereby sufficient illumination may be provided for all purposes, and which is adapted for example to utilize the new photoflood-lamp with its high intensity light without causing an undue heat that might injure the film or the paper in use. I provide also, as hereinafter more fully disclosed, means for correcting the distortions due to a tilting camera when the exposures are made. I provide also means whereby the enlarger can be predeterminedly set for a given size enlargement and a subsidiary focusing adjustment may be given for any purpose, as, for example, to soften the effect and avoid the appearance of sharp lines in the picture. Various other features of the invention will be set forth in detail in the ensuing description. Although I have in the single illustrated embodiment of the invention disclosed a contact printer and enlarger composed of many parts or elements all cooperating in combinations and sub-combinations for the purposes stated, and to carry out the described functions, I desire it to be understood that those purposes and functions, or certain of them, may be carried out by the use of other parts or elements cooperating in the same general way herein explained, and all within the scope of my invention, as set forth in the claims.

Referring more particularly to the drawings, wherein I have shown one embodiment only of my invention and to which embodiment my invention is not limited, the housing, body or casing is composed of two principal parts which have a vertical telescoping relation with respect to each other. To that end, I provide a base 1 shown in the several figures, and having feet 2, and secure permanently and rigidly thereto the lower part 3 of the housing or body, said part being herein shown as rectangular in cross section, though the exact shape may obviously be widely varied. The lower part 3 of the housing is herein shown as the inner of the two telescoping parts, as will be evident from Figs. 1 to 4, etc. Said part 3 is desirably composed of four members of sheet material secured together at their meeting edges by right angular strips 4, shown on a large scale in Fig. 17, where screws 5 are represented as employed to make a sufficiently rigid structure. The other part or member that has a telescoping relation with the lower part 3 is indicated generally at 6 in the several figures. In Fig. 17, said part 6 is shown as slightly spaced from the part 3 excepting at the corners where the angular strips 4 connect the four sheets 3 and also constitute a guide for the upper part 6 in its telescoping movement. The said part 6 is preferably provided at each corner with a lengthwise extending strip 7 that abuts against the adjacent angular strip 4 and constitutes a guiding formation. This general structure is indicated at each of the four corners of the apparatus in Fig. 14 and, as there indicated, the said upper or telescoping part or member 6 may be made of a single piece of sheet metal bent into proper form or shape. Comparing the position of adjustment shown, for example, in Figs. 1 and 2, with that shown in Figs. 3 and 4, it is noted that the two walled members or parts 3 and 6, are each of such vertical extent and are so formed and relatively proportioned, that in all functioning positions of vertical adjustment thereof, said two members or parts 3 and 6 extensively overlap and thereby form a double-walled rigid enclosure, thereby eliminating jarring distortions in all positions of adjustment.

Referring to Fig. 9, it will be observed that the flood light or other means of illumination of an electrical nature is represented at 8, there being a light guard at 9 supported by uprights 10 from the base 1. At 11 is represented a suitable resistance in the circuit and at 12, 13 are represented ventilation openings to prevent overheating.

By making both of the telescoping parts or members 3 and 6 of metal, and desirably of sheet metal, as stated, I cause a comparatively rapid dissipation or radiation of the heat originating in the said illuminating means 8 from the entire surface of the apparatus, and do not depend wholly on the circulation of air through the openings 12, 13. The metal has a high heat capacity, the heat being conducted through the entire area of the walls of the parts 3 and 6. Thus, the radiation is not confined to a small area close to the lamp or light 8. The result is a quick radiation from all the walls of the apparatus.

Viewing Figs. 1, 2, 3 and 4, it will be observed that the upper or telescoping part or member 6 is adapted to be moved vertically into any one of several different heights or elevations according to the proportional size of the print when an enlargement is to be made. While obviously the parts may be slid or adjusted to any one of a number of different predetermined positions, and that various means may be provided for the purpose of effecting a vertical adjustment of the part or member 6, within the scope and purpose of my invention, I have herein represented means for adjusting the upper part or member 6 to any one of three different positions, so as to make an enlargement that is either one and a half times, two and a half times, or four times as large as the negative, and I provide means, herein shown as of a dial nature whereby an indication is given when the upper part or member 6 has been moved to the proper extent for making any one of said three different sized enlargements, but providing, as hereinbefore stated, for then making a further refined adjustment or variation of adjustment from that indicated by the dial.

The apparatus composed of the two parts or members 3 and 6 constructed as thus far described and as illustrated in Figs. 1 to 4, 9, 14, 17, is a rigid telescoping structure and functions as one firm unit regardless of the size of the enlargement (that is, of the extent to which the part 6 is adjusted upward on the part 3). This is very desirable because it eliminates any change in the projected image on the platen due to vibration or jar of any kind. Any jar or vibration will be transmitted over nearly the entire structure, and hence there will be no change in the relation, for instance, of a point on the negative and a projected point on the sheet where the enlargement is made. If there were a jarring or movement, either of the electric light or lamp 8, or of the negative, or of the platen, in relation to either of the other two of said enumerated parts or elements, the result would be a blur in the projected image. This cannot occur in the apparatus herein disclosed, because said three parts or elements are always in the same relation to each other, no matter how far the member 6 is adjusted vertically. This is a practical point of great importance in commercial uses of the apparatus. Very often photographers' establishments are near railroads, and the jarring due to the train, or due to a passing truck in the street, very seriously interferes with the use of prior apparatus for enlargement purposes and has often compelled the photographer to restrict the times of use of his apparatus to hours in the evening or at night.

The dial means is shown most clearly in Figs. 1, 2, 3, 8, 12, 13, 15 and 16. It is directly associated with the enlarger structure (that is, with the lens equipment structure) and to that end is herein shown as having a geared relation with the lens barrel of said enlarger. I will, therefore, first refer to the said enlarger or lens equipment structure which is most clearly represented in Fig. 10, but to which type or structure of enlarging means my invention is not limited. Therein the lens adjustment barrel is shown in vertical section at 14, it being provided with an upright rack 15 preferably formed therewith, and lengthwise slidable with a sufficiently close fit in a tubular supporting member 16, in the wall thereof is mounted a stud or short shaft 17, clearly shown in Fig. 12, and having a pinion 18 meshing with the said vertical rack 15. In the upper portion of the lens barrel 14 is the lens mounting 19 of such usual or other structure as is necessary for making photographic enlargements and which, therefore, need not be more specifically described. Any other suitable lens equipment may be employed having capacity for adjustment up and down, that is, lengthwise of the apparatus, so that different sized enlargements may be made, and that is capable of ready removal in any suitable manner from the apparatus, so as to permit of contact printing, instead of enlargement. Referring again to the form of lens equipment shown, and to the particular means shown for adjustment and for removal, it will be observed that the said tubular supporting portion 16 is directly but removably received at its flat, lower end upon a supporting casting or annulus 20 (Fig. 10) that is supported by an inwardly extending portion 21 of the lower or fixed part or member 3 of the housing or body. Attached to the said casting 20 is a clear glass plate 22, the purpose of which will be set forth hereinafter. The shape of the casting 20 may obviously be varied within the scope of my invention in accordance with the shape of the directly associated parts, such as the enlarger structure supported thereby.

The stud or short shaft 17 (Fig. 12) is supported in a bearing 23 suitably carried by the tubular member 16 which is itself supported by the lower part 3 of the housing or body. As shown most clearly in Fig. 12, the stud 17 enters a lengthwise slidable sleeve 24 and receives a transversely extending pin 25, the head of which is received in a slot in the sleeve 24. Said sleeve 24 is mounted upon a shaft 26 horizontally extending through a wall of the inner and outer parts 3 and 6 in such a manner that the upper part or member 6 may be telescopingly moved for vertical adjustment as already explained. The said sleeve 24 is provided with a knurled portion 27 facilitating the lengthwise movement of the sleeve after the removal of the transverse pin 25 so that the stud or short shaft 17 and the shaft 26 may be separated, and thus the lens adjustment barrel and associated parts 14, 16, etc. may be removed bodily from the apparatus or structure when the apparatus is to be used only for contact printing. In order to permit such removal, the spring holding plates 27a are turned from the holding position shown in Figs. 8 and 14 to the removal position shown in Fig. 15.

When said holding plates 27a are in the position shown in Figs. 8 and 14, they engage the two lateral ears or extensions on the flange or rim at the lower end of the tubular member 16, as clearly shown in Fig. 8. This feature of quick and ready removability of the enlarger structure, including the lens 19, is an important feature of the combination of parts of my invention. My invention is not limited to the described means for adjustment, nor to the described means permitting removal, since these may obviously be widely varied within the scope of my invention.

The said shaft 26, as shown most clearly in Figs. 14 and 16, extends through a bearing 27 supported in the lower part 3 of the body, and has secured thereto a dial, shown at 28 in Figs. 13, 16, etc., which at different radial distances and at suitable spacing about its surface has openings 29, 30, 31 for the numbers 1½, 2½ and 4, which are vertically spaced on the upper part 6 of the housing, as shown at 32 in Fig. 1, the number 1½ appearing in its proper disk opening in Fig. 1.

When the part 6 has been slid or adjusted to its desired height for making an enlargement, the disk 28 will be turned by its knob 28a in either direction, and the numeral 1½, 2½ or 4, indicating the size of the enlargement, will appear at the proper opening in the dial, since the said several numerals are at the proper height for this purpose.

In Fig. 13, the numeral 4 appears through the opening 31 to indicate that the enlarger lens setting or lens equipment is positioned properly for enlarging the negative four times. Each of the openings 29, 30, 31 has a notch in its edge to be brought into register with a short horizontal line on the part 6 adjacent each of said numerals 1½, 2½, 4. As clearly shown in Figs. 1, 3 and 13, the upper part 6 is vertically slotted at 33, 34. This construction permits the relative vertical adjustment of the parts or members 3 and 6 of the casing notwithstanding the presence of the dial structure. Viewing Figs. 1 and 3, it will be evident that the slot 33 in reality constitutes a direct continuation of the slot 34, which continuation slot 33 is formed in a depending ear or strip extending downward from the lower edge of the member 6 at the side thereof. Said slot 33 directly receives therein the dial disk 28, most clearly shown in Figs. 13 and 16.

It will be understood that having quickly made the adjustment for enlarging 1½, 2½ or 4 times, and bringing the indicating number to the opening 29 or 30 or 31 therefor, a further slight manual adjustment may be made so as to soften or vary the reproduction, by turning the knob 28a, which therefore provides means for manually adjusting the lens equipment from the exterior of the apparatus, and which is found desirable in other forms or embodiments of my invention.

In order readily to lift or slide upwardly the upper part or member 6 of the housing or body, I have provided, in this embodiment of my invention, as most clearly indicated in Figs. 14 and 15, the knobs or handles 35, 36, mounted in the opposite walls of the said slidable or upper part or member 6. Each of said knobs or handles 35, 36 has secured thereto a headed plunger 37, the stem of which is surrounded by a coil spring 38. Said spring is received in a tubular housing 39 secured by its flange 40 to the wall of the outer or slidable part or member 6 of the framing. Said head 37 of each plunger 36 is adapted to enter a socket 41 provided, as shown in Fig. 16, in the wall of the inner member 3. In the event that there are the three positions of adjustment for enlarging respectively one and a half, two and a half and four times, there are three sockets 41 provided for each plunger 37. It will be understood that the user of the apparatus pulls outwardly simultaneously the two knobs 35, 36 with their plungers 37 and moves the outer part or member 6 of the housing or body up or down according to the desired adjustment.

It will be understood from the foregoing description and from the construction shown in the drawings that the upper member 6 may be quickly and accurately moved up or down so as to bring it into the position for enlarging either one and a half, two and a half or four times. This is due to the fact that the plungers 37 may be instantly withdrawn by their knobs or handles 35, 36 from the sockets 41 in which they are at the moment received, and, with the said plungers held outwardly, the upper part 6 is slid up or down until another desired pair of sockets 40 at the new elevation is reached, whereupon the plungers are released, and they enter said other sockets 41 at the said new elevation.

Such movement of the member 6 to a new position does not, however, adjust the lens 19 supported by the parts 14, 16. It is, therefore, necessary to adjust the lens, and this I am enabled to do without looking through the ground glass or platen glass 71 for the purpose of obtaining a sharp focus. This novel result is due to the fact that the dial 28 is upon the shaft 26 having the pinion 18 that meshes with and adjusts the rack 15, shown most clearly in Fig. 10. The dial disk 28 slides up or down in the slots 33, 34 according as the upper part 6 of the casing is slid up or down on the lower part 3. The said dial disk 28, having the three openings 29, 30, 31 therein at different radial distances from its center, is manually turned (after the upper part 6 has been brought into its new position) until a number appears in an opening in the said dial disk). Such number will be either the number 1½, 2½ or 4, which, as most clearly shown in Fig. 3, have been marked at the proper height and position upon the side of the said upper member 6. The position of the said marks 1½, 2½ and 4 are such that only the proper number can be made to appear at an opening in the dial disk 28, whatever be the selected height of the upper member 6. Thus, it is unnecessary in this embodiment of my invention to focus the lens by looking through the ground or platen glass, because the turning of the dial disk 28 until a number appears at an opening therein insures that the lens has been adjusted for the new position of the upper member 6.

So far as I am aware, I am the first to provide an enlarger that can be predeterminedly set for a given size enlargement and having means for accurately focusing the lens without viewing the image through a ground glass. My invention, however, is not limited to the means described for maintaining the parts or members 3 and 6 in adjusted position, since other means may be employed within the scope and purpose of the invention. The means described and shown, however, provide very effective and convenient means for the purpose.

Referring more particularly to Figs. 1, 2, 8 and 9, it will be observed that the apparatus is provided with a suitable electrical wiring 42 having a plug 43 by which connection may be made with the circuit of the building in which the apparatus is used. The said wiring is operatively connected with the lamp 8 and the details of the circuit, shown in Fig. 19, will be hereinafter more specifically referred to. Suitable switches are provided and especially so that, as indicated at 44 in Fig. 2, the light may be made dim as indicated at the letter "D", or bright as indicated by the letter "B", or may be turned off as indicated by the letter "O". The letters "F. P." indicate the focusing position.

The upper or outer part or member 6 of the housing or body of the apparatus is provided at any suitable place with a trap door 45, shown clearly in Fig. 2, of any suitable size and which is provided with suitable strong springs 46 to close the same. The purpose of the said door is to permit the user to resort to the so-called operation of "dodging", namely, the manual positioning of a piece of paper or some other slight obstruction in line with some part of a negative that is not to appear in the enlargement.

It frequently happens that pictures are taken with the camera not in a proper or normal upright position, in which case the contact print or enlargement would reveal the same defect. Therefore, I have provided means to support the sensitized paper at an angle to the horizontal corresponding, it may be, to the angle at which the picture was taken (off the normal or upright). In this manner the resulting picture will constitute a rectification of the error in taking the original picture. For this purpose (as shown most clearly in Figs. 1 and 8) I have represented the enlarging platen structure 47 as rockably mounted at 48 in the opposite walls of the upper part or member 6 of the apparatus, so that it may be positioned either horizontally or tilted at any desired angle. In Fig. 8, the said platen structure 47 is represented as substantially tilted from the horizontal. In order to secure the said platen structure in any angular position, it is provided with a depending strip 49 that is slotted as indicated at 50, so that it may slide past a nut 51 that may then be tightened on the threaded part 51a to hold the strip 49 in any position in which it has been placed.

When the apparatus is used as an enlarger instead of a contact printer the film or other negative is placed beneath the clear glass 22 (shown in Fig. 10), against which glass the negative is pressed firmly by suitable means here shown as a so-called film pressure pad 52, shown most clearly in Fig. 10. Between the glass 22 and the film pressure pad 52, there is an opening 53 in a transverse wall or transverse surface 54 of the apparatus and a vertically adjustable guide plate 54a. I provide suitable means to move the film pressure pad into and out of functioning position. In Fig. 10, the said pad is shown as out of functioning position. It is supported in a rectangular frame 55 provided with ears or depending portions 56, 56a constituting members of toggles, the other members whereof are indicated at 57, 58. Springs 59, 60 are provided tending to straighten the toggles and thus move the film pressure pad 52 into functioning position. The respective members of the two toggles are pivoted together, as indicated at 61, 62, and the lower members 57, 58 of the toggles are pivoted in the framing at 63, 64 (Fig. 9).

I provide means whereby from the outside of the apparatus the said toggles may be manipulated so as to move the film pressure pad 52 into and out of functioning position. For this purpose, I have represented the joint or pivot 62 of the toggle 56a, 58 as having connected thereto an operating rod 65 which, as shown most clearly in Fig. 10, extends through an opening 66 in the wall of the housing or body where it is provided with a knurled knob 67 which, when turned in one direction or the other, causes a pin 68 transversely mounted in the rod 65 to ride along the inclined face 69 of a cam, shown most clearly in Figs. 10 and 11, as fast upon the housing. The structure is such that the turning movement of the knob 67 compels a lengthwise movement of the connecting rod 65, because of the inclined cam face 69, so that the film pressure pad 52 is moved into or out of functioning position as the case may be. While I have specifically described one embodiment or means for maintaining the negative under pressure beneath the lens equipment for the purpose stated, it is to be understood that my invention is not limited to such means, as obviously other means may be employed by me for the same purpose within the scope of my invention. In other words, my invention is not limited to the means herein shown for holding the film or other negative against the glass 22, as I may in other types of apparatus use other means to hold a negative in operative position in such relation to the other parts of the apparatus.

I will next describe the construction of parts whereby the apparatus is adapted to be used as a printing machine instead of an enlarger.

The lens structure 14, 16 (being the parts above the clear glass 22 and the casting 20) is, of course, removed, and in the disclosed embodiment of my invention, by first disconnecting the coupling, shown most clearly in Fig. 12, and turning out of retaining position the spring holding plates 27a as already described. The lamp 8 then has an unrestricted action through the glass plates 22, 52 (Fig. 10 and elsewhere) and through the opal diffusing plate 70, shown most clearly in Figs. 9 and 10, and then through the glass 71 of the platen structure 47, as best shown in Figs. 7 and 8.

The negative of whatever character employed is laid upon the said glass 71, which is properly masked in any suitable manner, and the sensitized paper is laid in contact with the said negative with the platen device hereinafter referred to in its open or receiving position, as shown in Fig. 1, after which the said platen device is closed so as to hold the sensitized paper and the negative firmly in contact during the printing operation.

As shown most clearly in Figs. 1 and 7, where the platen device is shown respectively in open or non-functioning and in closed positions, and in Fig. 8, the platen structure 47 has the glass plate 71 already described. Directly above the said glass plate 71 is mounted the platen pressure pad 72 of any suitable material, such as wood, and hinged at 73 (Figs. 6 and 7) to a stationary plate or part 74 that may be of the same material. Desirably at its lower face the pad 72 is provided with a felt member 75 which cooperates in holding the negative and the sensitized paper properly in contact. As shown most clearly in Figs. 6 and 7, the plate or part 74 is provided with two brackets 76, 77 in which is pivoted a generally rectangular frame 78, provided with a cross handle 79. The said frame 78 is provided with a transverse intermediate rod 80 which, as best shown in Fig. 7, is movable in vertical slots 81 in upright brackets 82. Surrounding the pivots 83, 84 of the frame 78 are springs 83a, 84a tending to elevate the said frame from its down or functioning position. Mounted upon the said pressure pad 72, in a suitable housing 85, is a switch 86 that may be of any usual or suitable construction and from which extends, as most clearly shown in Figs. 1 and 6, the conductor 87, the latter extending downwardly, as indicated in Fig. 8, to the circuits or wiring for the lamps, etc., as will be described.

The entire upper portion of the apparatus, including the pressure pad 72 and the part 74, may be swung backward so as to expose the entire upper portion of the apparatus. For that purpose, the said part or member 72 is itself hinged as indicated at 88 in Figs. 3 and 7, there being provided a horizontal rest portion 89 to support the said combined parts when swung into vertical position.

The negative and the sensitized paper having been placed upon the glass 71, the handle 79 is grasped and the platen pressure pad 72 is moved down into functioning position, as shown in Fig. 7. Because of the vertical slots 81 in the uprights 82 and a co-acting horizontal slot 90 in the part 91 connected to and extending from the switch structure 85, and because of the V shaped spring 92 (best shown in Figs. 1 and 3), the said pressure pad 72 is brought in contact with the sensitized paper which has been placed on the platen or glass 71 under pressure and is held quite firmly. A further downward movement on the said pressure spring 92 results in the frame structure 78, 79, 80, etc. traveling in a downward direction in the slots 81 until the handle 79 is in its all-the-way-down position illustrated in full lines in Fig. 3 as well as in Fig. 7. Because of such fully-down position, the switch 86 has likewise been moved fully downward, thereby causing the lamp 94 (shown in Fig. 19) to be short circuited out. This allows the lamp 8 of Fig. 19 to burn at its full brilliancy, depending, however, on the position of the switch 44 of Fig. 2 as to whether said lamp will be in its bright or dim condition.

The said handle 79 is held down for a sufficient length of time to allow for the correct exposure and is then released. In such release, the handle 79 moves away from the platen pressure pad 72 because of the spring 92, thus causing the switch arm 91 to move into an upper position, and thereby open the circuit about the lamp 94. This places the said lamp 94 in series with the lamp 8, allowing said lamp 94 to burn at approximately the full brilliancy, causing lamp 8 to be practically extinguished. Inasmuch as said lamp 94 is a red lamp, it has no action on sensitized material.

The foregoing provision is important because if the lamp 8 be not discontinued prior to the time the pressure is released on the pad 72, there may be movement of the sensitized material in relation to the image on the negative, and the result would be a blurred or fuzzy condition in the picture. It will be noted that before the pressure is released upon the platen pad 71, the switch 86 has been opened and the light or lamp 94 has been placed in series with the lamp 8, which, due to the low wattage or relatively high resistance, no longer has any illuminating power. With the further release of the handle 79 the platen 72 is raised to the position shown in full lines in Fig. 1 and a further upward movement of the said parts will allow the sensitized paper to be released and to be removed from its position.

It will be noted that the switch mechanism 85, etc. does not have to be altered, whether the apparatus be used for printing or for enlarging. In enlarging, the handle 79 is moved downward to the all-the-way-down position as described, and the circuit will function as already set forth. It will be understood that the light or lamp 94 is used for a dual purpose. It is placed in series with the lamp 8 and is short circuited out by the operating switch 86, which is diagrammatically indicated in Fig. 19, when the handle 79 has been moved all the way down. The said lamp 94 is, as already stated, a red lamp, and furnishes illumination for properly positioning the negatives and the sensitized paper when the apparatus is used as a printer. It is also used as a resistance around the switch 86 to prevent arcing, when the said switch 86 is operating.

Preferably I also provide an auxiliary circuit switch 96 (diagrammatically indicated in Fig. 19) to allow the operator to illuminate the lamp 8 when the apparatus is used as an enlarger to cause the projection to take place through the platen glass 71 onto the ground glass 97 (best shown in Fig. 8) directly above the platen glass 71, whereby the operator may manually focus the lens so as to get the best results when the platen glass 71 is in a tilted position as shown, for example, in Fig. 8. This is because it may be necessary to make some slight correction due to the tilted position, away from the accurately marked position indicated by the dial 28. As shown in Fig. 8 and elsewhere, I preferably provide a coiled wire 98 to support the wiring member 87.

In Fig. 5, I have represented at 99 a door or handhole for changing lamps in the circuit when necessary. In Fig. 9, I have represented at 100 light guards which shield ventilation openings 12, and it will be understood that the same are provided wherever necessary.

It is, of course, necessary to determine and to select the proper amount of illumination for the particular negative that is to be used for printing or enlarging purposes, and the type of sensitized paper that is to be used therewith. Normally a so-called photo-flood-lamp is used in the enlarging operation, and for the slower grades of paper or for very dense negatives, I use such a lamp at its full brilliancy. For the faster grades of paper and for thinner negatives or for combinations of both, I reduce the illumination of the said lamp by cutting in a resistance indicated at 102 in Fig. 19, which will reduce the illumination to approximately half of its value when such resistance 102 is cut out.

It will be understood from the foregoing that in order to make a second enlargement from the same strip of film (that is, to make an enlargement from the second exposure on that film), it is merely necessary to turn the knob 67 in such a position as again to release the pressure pad 52 from the glass 22, allowing the film to be moved into the next picture area position. The knob 67 is then turned in the opposite direction, allowing or causing the pad 52 to close against the glass 22, thereby holding the film again in rigid position and the previously described operations take place.

Referring to the one embodiment of my invention herein disclosed, if for any particular picture area on a film or for any negative, it is desired instead of making the four times enlargement to make the one and a half times enlargement, the knobs 35, 36 are pulled outward, allowing the upper telescoping part or member 6 to slide down to its lowest position and the proper slot in the dial 28 is thereupon lined up or positioned to show the figure 1½, it being necessary to turn the knob 28a to expose said figure. The parts are now in a position to make a one and a half times enlargement from the negative which has been placed in position, and the rest of the operation is as previously described.

It will be seen that changing from one size enlargement to another can be done very readily and quickly, and the focusing is very easily taken care of, because all that is necessary to do is to slide the upper part or member 6 into one of the three positions which will bring the number indicating the size of the enlargement at the proper opening in the dial 28 (which needs merely to be turned until its opening at the new level discloses the number). Therefore, very rapid work can be done with the apparatus. My invention is, of course, not limited, in accomplishing this result, to the particular means herein shown for effecting vertical adjustment of the upper part or member 6 upon the lower or basal member 3.

The disclosed apparatus also presents a distinct advantage over the non-focusing type of enlarger for the reason that if it is desired to soften up the focus in a pictorial scene, for example, it is merely necessary to throw the lens slightly out of focus by a slight movement on the focusing knob 28a to a position slightly variant from its position with the number 4, for example, showing through its opening in the dial. When making enlargements with the distortion correcting part of the apparatus in use, it will be necessary again to focus manually so as to get the sharpest condition with the print. This may be done by laying a piece of ground glass on the platen and throwing the focusing switch into focusing position, which will allow the white light to become illuminated, and the image is projected on the ground glass, whereupon the apparatus may be manually focused as described.

Having thus described one illustrative embodiment of the invention, and to which my invention is not limited, it is to be understood that although specific terms are employed, they are used in a generic and descriptive sense and not for purposes of limitation, the scope of the invention being set forth in the following claims.

I claim:—

1. Apparatus for enlarging and for contact printing for photographic purposes from negatives, consisting of a housing or enclosure having two substantially rectangular, telescoping parts relatively slidable vertically and containing an enlarging lens equipment, means for supporting the negative either below or above the lens equipment, one of said telescoping parts having sockets at different heights and the other of said telescoping parts having one or more spring pressed plungers constituting constantly detached parts adapted to enter said sockets to hold the vertically slidable part at a desired position of vertical adjustment.

2. Apparatus for enlarging and for contact printing for photographic purposes from negatives, consisting of a complete housing or enclosure comprising a lower, substantially rectangular, walled member and an upper substantially rectangular, walled member mounted in vertically telescoping relation for ready vertical sliding adjustment, said lower member having an enlarging lens equipment supported therein, and means for supporting the negative either below or above the lens equipment, said lens equipment including a ring-like member supported by one of the slidable parts and a transparent plate supported by said ring-like member.

3. Apparatus for enlarging and for contact printing for photographic purposes from negatives, consisting of a complete housing or enclosure comprising a lower, substantially rectangular, walled member and an upper substantially rectangular, walled member mounted in vertically telescoping relation for ready vertical sliding adjustment, said lower member having an enlarging lens equipment supported therein, means for supporting the negative either below or above the lens equipment, said lens equipment including a ring-like member supported by one of the slidable parts and a transparent plate supported by said ring-like member, and a pressure pad member adapted to be moved into and out of functioning engagement with said transparent plate.

4. Apparatus for enlarging and for contact printing for photographic purposes from negatives, consisting of a housing or enclosure having two substantially rectangular, walled telescoping parts relatively slidable vertically and containing an enlarging lens equipment supported by the walls of one of said parts, and means for supporting the negative below and above the lens equipment respectively, said means for supporting the negative below the lens equipment including a pressure pad member and means for operating the same from the outside of the housing, said means including toggle members and an operating rod for moving the same, said rod being accessible at the exterior of the housing.

5. Apparatus for enlarging and for contact printing for photographic purposes from negatives, consisting of a housing or enclosure having parts relatively slidable vertically and containing an enlarging lens equipment, and means for supporting the negative either below or above the lens equipment, said means for supporting the negative below the lens equipment including a pressure pad member and means for operating the same from the outside of the housing, said means including toggle members and an operating rod for moving the same, said rod being accessible at the exterior of the housing, and cam means cooperating with said rod to effect movement of said toggle members.

6. Apparatus for enlarging and for contact printing for photographic purposes from negatives, consisting of a housing or enclosure having upper and lower parts, the former being slidable vertically and the latter containing an enlarging lens equipment supported in the walls thereof, means for supplementally adjusting said lens from the outside of said housing, means for supporting the negative either below or above the lens equipment, said upper part having a vertical slot in a wall therein for the reception of dial means, and dial means supported by and movable with said lower part along said slot.

7. Apparatus for enlarging and for contact printing for photographic purposes from negatives, consisting of two vertically positioned, relatively slidable four walled members constituting a casing, the lower member whereof supports an enlarging lens equipment, said members being provided with co-acting means by which they may be readily positioned at any one of a series of heights for the purpose of making enlargements of any one of a series of sizes corresponding to the selected height, in combination with means to indicate, without observance through a ground glass, the proper lens adjustment corresponding to the selected height for enlargement, said means including a rotatable dial having indicating formations and connected to said lens equipment and slidable along a face of said upper member in the sliding adjustment of said members, and also including coacting spaced indications on said upper member.

8. Apparatus for enlarging and for contact printing for photographic purposes from negatives, consisting of two vertically positioned, relatively slidable four walled members constituting a casing, the lower member whereof supports an enlarging lens equipment, said members being provided with co-acting means by which they may be readily positioned at any one of a series of heights for the purpose of making enlargements of any one of a series of sizes corresponding to the selected height, said means including a rotatable dial having indicating formations and connected to said lens equipment and slidable along a face of said upper member in the sliding adjustment of said members, and also including coacting spaced indications on said upper member, and provisions for manually adjusting the lens to correspond to the selected enlargement without the necessity of inspection through the around glass.

9. Apparatus for enlarging and for contact printing for photographic purposes from negatives, consisting of two vertically positioned, relatively slidable members constituting a casing, the lower member whereof supports an enlarging lens equipment, said member being provided with coacting means by which they may be readily positioned at any one of a series of heights for the purpose of making enlargements of any one of a series of sizes corresponding to the selected height, the upper of said members having a vertical slot 33, 34 and marked with enlargement indications, and a rotary dial disk operatively connected to the adjusting means of the lens equipment so that the act of rotating the dial exposes the proper marking of the enlargement indication at the selected height.

10. Apparatus for enlarging and for contact printing for photographic purposes from negatives, consisting of two vertically positioned, relatively slidable members constituting a casing, the lower member whereof supports an enlarging lens equipment, said members being provided with co-acting means by which they may be readily positioned at any one of a series of heights for the purpose of making enlargements of any one of a series of sizes corresponding to the selected height, the upper member having a vertical slot 33, 34 and marked at the proper points with the numbers for the several enlargements, and a rotary dial 28 geared with the lens adjustment, said dial having a series of openings therein to permit exposure of the proper enlargement indication number when the disk is turned in adjusting the lens.

11. An apparatus for enlarging and for contact printing for photographic purposes from negatives, an upright closed housing consisting of a basal member having four upright walls and an upper similar member telescopingly positioned upon the basal member for ready vertical movement to any one of a series of different enlargement positions; an enlarging lens equipment supported in and by said basal member, lighting means in said basal member, one of said members having in opposite walls a series of sockets in spaced vertical alignment, and the other of said members having a pair of plungers mounted in corresponding opposite side walls for engagement with the respective sockets, means below said lens equipment and mounted in said basal member for securing the negative in position for enlargement; receiving members at the top of the upper member for receiving and securing in position the negative and the sensitized paper for contact printing; and means to tilt said receiving means with the negative and sensitized paper in order to compensate for distortions in taking the picture upon the negative.

12. As an apparatus for enlarging and for contact printing for photographic purposes from negatives, an upright closed housing consisting of a basal member having four upright walls and an upper similar member telescopingly positioned upon the basal member for ready vertical movement to any one of a series of different enlargement positions; an enlarging lens equipment supported in and by said basal member, lighting means in said basal member; one of said members having in opposite walls a series of sockets in spaced vertical alignment and the other of said members having a pair of plungers mounted in corresponding opposite side walls for engagement with the respective sockets, means below said lens equipment and mounted in said basal member for securing the negative in position for enlargement; receiving members at the top of the upper member for receiving and securing in position the negative and the sensitized paper for contact printing; and means to tilt said receiving means with the negative and sensitized paper in order to compensate for distortions in taking the picture upon the negative; and dial means geared to the lens equipment and extending to the outside of said casing for adjusting manually the lens to correspond to each enlargement level.

13. As an apparatus for enlarging and for contact printing for photographic purposes from negatives, an upright closed housing consisting of a basal member having four upright walls and an upper similar member telescopingly positioned upon the basal member for ready vertical movement to any one of a series of different enlargement positions; an enlarging lens equipment supported in and by said basal member, lighting means in said basal member; one of said members having in opposite walls a series of sockets in spaced vertical alignment and the other of said members having a pair of plungers mounted in corresponding opposite side walls for engagement with the respective sockets, means below said lens equipment and mounted in said basal member for securing the negative in position for enlargement; receiving members at the top of the upper member for receiving and securing in position the negative and the sensitized paper for contact printing, including a platen having an electric switch and wiring connecting said switch and said lighting means.

14. As an apparatus for enlarging and for contact printing for photographic purposes from negatives, an upright closed housing consisting of a basal member having four upright walls and an upper similar member telescopingly positioned upon the basal member for ready vertical movement to any one of a series of different enlargement positions, an enlarging lens equipment supported in and by said basal member, lighting means in said basal member, said two members having interengaging provisions for supporting the upper member at any desired different enlargement level, and means accessible at the outside of the housing and operatively connected with the lens for manually adjusting the lens without the necessity of using the ground glass.

15. As an apparatus for enlarging and for contact printing for photographic purposes from negatives, an upright closed housing consisting of a basal member having four upright walls and an upper similar member telescopingly positioned upon the basal member for ready vertical movement to any one of a series of different enlargement positions, an enlarging lens equipment supported in and by said basal member, lighting means in said basal member, means for supporting the negative by the walls of the basal member below the lens equipment, the upper member of the housing having at the top thereof platen means to receive the negative and sensitized paper for contact printing, together with means for changing the angle of said platen means to compensate for distortion in taking the picture.

16. As an apparatus for enlarging and for contact printing for photographic purposes from negatives, an upright closed housing consisting of a basal member having four upright walls and an upper similar member telescopingly positioned upon the basal member for ready vertical movement to any one of a series of different enlargement positions, an enlarging lens equipment supported in and by said basal member, lighting means in said basal member, means for readily supporting the upper member at any one of a number of different enlargement levels, the said upper member having at the top thereof a transparent plate for receiving the negative and sensitized paper, a platen to secure the negative and sensitized paper in position for contact printing at said transparent plate, and adjusting means to vary the angle of said transparent plate.

17. As an apparatus for enlarging and for contact printing for photographic purposes from negatives, an upright closed housing consisting of a basal member having four upright walls and an upper similar member telescopingly positioned upon the basal member for ready vertical movement to any one of a series of different enlargement positions, an enlarging lens equipment supported in and by said basal member, lighting means in said basal member, means for supporting the negative either below or above the said lens equipment, means accessible at the outside of the housing for focusing the lens equipment after the housing has been vertically adjusted to the desired enlargement level and without requiring focusing through the ground glass, and means for disconnecting said focusing means whereby said lens structure may be removed from the lower member of the housing when the apparatus is used for contact printing.

18. As an apparatus for enlarging and for contact printing for photographic purposes from negatives, an upright closed housing consisting of a basal member having four upright walls and an upper similar member telescopingly positioned upon the basal member for ready vertical movement to any one of a series of different enlargement positions, an enlarging lens equipment supported in and by said basal member, lighting means in said basal member, means for supporting the negative below the lens equipment for enlargement purposes and at the top of the upper member for contact printing, focusing means for the lens equipment accessible at the outside of the structure, and means for readily disconnecting said focusing means from the lens equipment so that the latter may be readily removed from the lower member of the apparatus when the apparatus is used for contact printing.

19. As an apparatus for enlarging and for contact printing for photographic purposes from negatives, an upright closed housing consisting of a basal member having four upright walls and an upper similar member telescopingly positioned upon the basal member for ready vertical movement to any one of a series of different enlargement positions, an enlarging lens equipment supported in and by said basal member, lighting means in said basal member, means below the lens equipment and supported by the walls of the basal member for supporting the negative in position for enlargement, said means including a transparent plate and a pressure pad member together with means to move said pressure pad member toward and from said transparent plate so as to engage the negative therebetween.

20. As an apparatus for enlarging and for contact printing for photographic purposes from negatives, an upright closed housing consisting of a basal member having four upright walls and an upper similar member telescopingly positioned upon the basal member for ready vertical movement to any one of a series of different enlargement positions, an enlarging lens equipment supported in and by said basal member, lighting means in said basal member, means below the lens equipment and supported by the walls of the basal member for supporting the negative in position for enlargement, said means including a transparent plate and a pressure pad member together with means to move said pressure pad member toward and from said transparent plate so as to engage the negative therebetween, said enlarging lens equipment having a ring-like member at the bottom thereof to support the said transparent plate.

21. As an apparatus for enlarging and for contact printing for photographic purposes from negatives, an upright closed housing consisting of a basal member having four upright walls and an upper similar member telescopingly positioned upon the basal member for ready vertical movement to any one of a series of different enlargement positions, an enlarging lens equipment supported in and by said basal member, lighting means in said basal member, means below the lens equipment and supported by the walls of the basal member for supporting the negative in position for enlargement, said means including a transparent plate and a pressure pad member together with means to move said pressure pad member toward and from said transparent plate so as to engage the negative therebetween, said enlarging lens equipment having a ring-like member at the bottom thereof to support the said transparent plate, said enlarging lens equipment being readily removable from the basal member of the housing to permit the apparatus to be used for contact printing.

22. As an apparatus for enlarging and for contact printing for photographic purposes from negatives, an upright housing consisting of a basal member and an upper member positioned upon the basal member for ready vertical movement to any one of a series of different enlargement positions, an enlarging lens equipment supported in and by said basal member, lighting means in said basal member, means for supporting the negative either below or above the said lens equipment, means accessible at the outside of the housing for focusing the lens equipment after the housing has been vertically adjusted to the desired enlargement level and without requiring focusing through the ground glass, and means for disconnecting said focusing means whereby said lens structure may be removed from the lower member of the housing when the apparatus is used for contact printing.

23. Apparatus for enlarging and for contact printing for photographic purposes from negatives, consisting of a complete housing or enclosure comprising a lower member and an upper member mounted in vertically telescoping relation for ready vertical sliding adjustment, said lower member having an enlarging lens equipment supported therein, and means for supporting the negative either below or above the lens equipment, said lens equipment including a ring-like member supported by one of the slidable parts and a transparent plate supported by said ring-like member.

24. Apparatus for enlarging and for contact printing for photographic purposes from negatives, consisting of a complete housing or enclosure comprising a lower member and an upper member mounted in vertically telescoping relation for ready vertical sliding adjustment, said lower member having an enlarging lens equipment supported therein, means for supporting the negative either below or above the lens equipment, said lens equipment including a ring-like member supported by one of the slidable parts and a transparent plate supported by said ring-like member, and a pressure pad member adapted to be moved into and out of functioning engagement with said transparent plate.

25. Apparatus for enlarging and for contact printing for photographic purposes from negatives, consisting of a housing or enclosure having parts relatively slidable vertically and containing an enlarging lens equipment, and means for supporting the negative either below or above the lens equipment, said means for supporting the negative below the lens equipment including a pressure pad member, and means for operating the same from the outside of the housing, said means including toggle members and an operating rod for moving the same, said rod being accessible at the exterior of the housing, and cam means cooperating with said rod to effect movement of said toggle members.

26. As an apparatus for enlarging and for contact printing for photographic purposes from negatives, an upright closed housing consisting of a basal member having four upright walls and an upper similar member telescopingly positioned upon the basal member for ready vertical movement to any one of a series of different enlargement positions, an enlarging lens equipment supported in and by said basal member, lighting means in said basal member, one of said members having in opposite walls a series of sockets in spaced vertical alignment, and the other of said members having a pair of plungers mounted in corresponding opposite side walls for engagement with the respective sockets, means below said lens equipment and mounted in said basal member for securing the negative in position for enlargement; and receiving members at the top of the upper member for receiving and securing in position the negative and the sensitized paper for contact printing.

27. Apparatus for enlarging and for contact printing for photographic purposes from negatives, consisting of a housing or enclosure having upper and lower parts, the former being slidable vertically and the latter containing an enlarging lens equipment supported in the walls thereof, being readily disconnectible from the dial means and readily removable from the housing, means for supporting the negative either below or above the lens equipment, said upper part having a vertical slot in a wall therein for the reception of dial means, and dial means supported by and movable with said lower part along said slot.

28. Apparatus for enlarging and for contact printing for photographic purposes from negatives, consisting of a complete housing or enclosure comprising a lower, substantially rectangular, walled member and an upper, substantially rectangular walled member mounted in vertically telescoping relation for ready vertical sliding adjustment, said lower member having an enlarging lens equipment supported therein, and means for maintaining the negative under pressure against displacement selectively either below or above said lens equipment, said lower walled member having a lens equipment supporting member extending transversely inside the housing to receive and support said lens equipment, and also formed to receive a transparent plate constituting part of the means for maintaining the negative under pressure below said lens equipment.

29. Apparatus for enlarging and for contact printing for photographic purposes from negatives, consisting of a complete housing or enclosure comprising a lower, substantially rectangular, walled member and an upper, substantially rectangular, walled member mounted in vertically telescoping relation for ready vertical sliding adjustment, said lower member having an enlarging lens equipment supported therein, means for supporting the negative either below or above the lens equipment, said lower walled member having a lens-equipment supporting member extending transversely inside the housing to receive and support said lens equipment and also formed to receive a transparent plate, and a pressure pad member adapted to be moved into and out of functioning engagement with said transparent plate.

30. Apparatus for enlarging and for contact printing for photographic purposes from negatives, consisting of a complete housing or enclosure comprising a lower rigidly walled member polygonal in cross section and an upper member similarly shaped in cross section, being also rigidly walled, said members being mounted in vertically telescoping relation for ready vertical sliding adjustment, said lower member having an enlarging lens supported therein, means for supporting the negative either below or above the lens equipment, and means provided at a plurality of predetermined elevations for holding the adjustable part of the housing at any one of said predetermined elevations, said two walled members each being of such vertical extent and so formed and relatively proportioned that in all functioning positions of relative vertical adjustment thereof, said two members extensively overlap and thereby form a double-walled rigid enclosure, thereby eliminating jarring distortions in all positions of adjustment thereof.

31. Apparatus for enlarging and for contact printing for photographic purposes from negatives, consisting of a complete housing or enclosure comprising a lower rigidly walled member polygonal in cross section and an upper member similarly shaped in cross section, being also rigidly walled, said members being mounted in vertically telescoping relation for ready vertical sliding adjustment, said lower member having an enlarging lens supported therein, means for supporting the negative either below or above the lens equipment, and dial means for indicating the size of the enlargement at each of the elevations to which the adjustable part is moved, said two walled members each being of such vertical extent and so formed and relatively proportioned that in all functioning positions of relative vertical adjustment thereof, said two members extensively overlap and thereby form a double-walled rigid enclosure, thereby eliminating jarring distortions in all positions of adjustment thereof.

32. Apparatus for enlarging and for contact printing for photographic purposes from negatives, consisting of a complete housing or enclosure consisting of a lower rigid polygonal walled member and an upper rigid similarly polygonal walled member mounted in vertically telescoping relation for ready vertical sliding adjustment, said lower member having an enlarging lens equipment supported therein and means for supporting the negative either below or above the lens equipment, the said members having a cooperating guiding means at corners thereof for the vertical adjusting movement and for reinforcing said parts, said two walled members each being of such vertical extent and so formed and relatively proportioned that in all functioning positions of relative vertical adjustment thereof, said two parts or members extensively overlap and thereby form a double-walled rigid enclosure, thereby eliminating jarring distortions in all positions of adjustment thereof.

33. An apparatus for enlarging and for contact printing for photographic purposes from negatives consisting of a complete housing or enclosure consisting of a lower polygonal rigid walled member and an upper substantially similar polygonal rigid walled member mounted in vertical telescoping relation for ready vertical sliding adjustment, said lower member having an enlarging lens equipment supported therein, means for supporting the negative therebelow for enlargment purposes, said two walled members each being of such vertical extent and so formed and relatively proportioned that in all functioning positions of relative vertical adustment thereof, said two members extensively overlap and thereby form a double-walled rigid enclosure, thereby eliminating jarring distortions in all positions of adjustment thereof, said housing having above the lens structure a movable platen to be brought into contact with the sensitized paper for contact printing, a pivoted handle member for operating said platen, interengaging connections between said platen and said handle member, electric lighting means within said housing and including wiring of an electric circuit, and an automatic switch means associated with said circuit when operated by movement of said platen.

34. Apparatus for enlarging and for contact printing for photographic purposes from negatives consisting of a complete housing or enclosure comprising a lower polygonal rigid walled member and a similarly polygonal upper rigid walled member mounted in vertically telescoping relation for ready vertical sliding adjustment, said lower member having an enlarging lens equipment supported therein, means constituting a permanent part of the said housing for supporting the negative selectively either below or above the lens equipment, focusing means for the said lens equipment, means to operate said focusing means from the outside of the structure, and means for readily disconnecting said focusing means so that the lens structure may be removed from the apparatus when the latter is used for printing, said two walled members each being of such vertical extent and so formed and relatively proportioned that in all functioning positions of relative vertical adjustment thereof, said two members extensively overlap and thereby form a double-walled rigid enclosure, thereby eliminating jarring distortions in all positions of adjustment thereof.

35. Apparatus for enlarging and for contact printing for photographic purposes from negatives consisting of a complete housing or enclosure comprising a lower polygonal rigid walled member and a similarly polygonal upper rigid walled member mounted in vertically telescoping relation for ready vertical sliding adjustment, said lower member having an enlarging lens equipment supported therein, means constituting a permanent part of the said housing for supporting the negative selectively either below or above the lens equipment, rack means for focusing the lens structure, means to operate said rack from the outside of the housing, and means for readily disconnecting said operating means from said rack, thereby permitting quick removal of said lens equipment, said two walled members each being of such vertical extent and so formed and relatively proportioned that in all functioning positions of relative vertical adjustment thereof, said two members extensively overlap and thereby form a double-walled rigid enclosure, thereby eliminating jarring distortions in all positions of adjustment thereof.

36. Apparatus for enlarging and for contact printing for photographic purposes from negatives consisting of a complete housing or enclosure comprising a lower polygonal rigid walled member and a similarly polygonal upper rigid walled member mounted in vertically telescoping relation for ready vertical sliding adjustment, said lower member having an enlarging lens equipment supported therein, means for supporting negatives either below or above the lens equipment, electric lighting means for said housing and circuit means connected with said electric lighting means and adapted to be plugged into a local circuit, said two walled members each being of such vertical extent and so formed and relatively proportioned that in all functioning positions of relative vertical adjustment thereof, said two members extensively overlap and thereby form a double-walled rigid enclosure, thereby eliminating jarring distortions in all positions of adjustment thereof.

37. Apparatus for enlarging and for contacting printing for photographic purposes consisting of a complete housing or enclosure comprising a lower polygonal rigid walled member and a similarly polygonal upper rigid walled member mounted in vertically telescoping relation for ready vertical sliding adjustment, said lower member having an enlarging lens equipment supported therein, said members being provided with coacting means by which they may be readily positioned at any one of a series of heights for the purpose of making enlargements of any one of a series of sizes corresponding to the selected height, said two walled members each being of such vertical extent and so formed and relatively proportioned that in all functioning positions of relative vertical adjustment thereof, said two members extensively overlap and thereby form a double-walled rigid enclosure, thereby eliminating jarring distortions in all positions of adjustment thereof, said upper member having enlargement indications at suitably spaced points on an exposed wall thereof, and a dial having indicating formations and itself operatively connected to the lens equipment and movable along a wall of said upper member in the relative vertical adjustment of said members, so as to coact with the proper enlargement indication when the lens is properly adjusted for the selected enlargement.

38. As an apparatus for enlarging and for contact printing for photographic purposes from negatives, an upright closed housing consisting of a basal member polygonal in cross section and an upper member similarly polygonal in cross section and positioned upon the said basal member for ready vertical adjustment in any one of a series of different enlargement positions, each of said members being a walled member, said two walled members each being of such vertical extent and so formed and relatively proportioned that in all functioning positions of relative vertical adjustment thereof, said two members extensively overlap and thereby form a double-walled rigid enclosure, thereby eliminating jarring distortions in all positions of adjustment thereof, an enlarging lens equipment supported in and by said basal member, lighting means in said basal member, means for supporting the negative by the walls of the said basal member below the lens equipment, the upper member of the housing having at the top thereof platen means to receive the negative and sensitized paper for contact printing, together with means for changing the angle of said platen means to compensate for distortion in taking the picture.

39. As an apparatus for enlarging and for contact printing for photographic purposes from negatives, an upright closed housing consisting of a basal member polygonal in cross section and an upper member similarly polygonal in cross section and positioned upon the said basal member for ready vertical adjustment in any one of a series of different enlargement positions, each of said members being a rigid walled member, said two walled members each being of such vertical extent and so formed and relatively proportioned that in all functioning positions of relative vertical adjustment thereof, said two members extensively overlap and thereby form a double-walled rigid enclosure, thereby eliminating jarring distortions in all positions of adjustment thereof, an enlarging lens equipment supported in and by said basal member, lighting means in said basal member, and means below the lens equipment and supported by the basal member for supporting the negative in position for enlargement, said means including a transparent plate and a pressure pad member together with means to move said pressure pad member toward and from said transparent plate so as to engage the negative therebetween.

40. As an apparatus for enlarging and for contact printing for photographic purposes from negatives, an upright closed housing consisting of a basal member polygonal in cross section and an upper member similarly polygonal in cross section and positioned upon the said basal member for ready vertical adjustment to any one of a series of different enlargement positions, each of said members being a rigid walled member, said two walled members each being of such vertical extent and so formed and relatively proportioned that in all functioning positions of relative vertical adjustment thereof, said two members extensively overlap and thereby form a double-walled rigid enclosure, thereby eliminating jarring distortions in all positions of adjustment thereof, said housing having an enlarging lens equipment supported therein, means to hold the negative under pressure against displacement below said lens equipment, receiving means located at the top of the housing to hold under pressure the negative and sensitized paper in position for contact printing above said lens equipment, and means for changing the angle of said receiving means to permit the rectification of error in taking the original picture.

41. As an apparatus for enlarging and for contact printing for photographic purposes from negatives, an upright closed housing consisting of a basal member polygonal in cross section and an upper member similarly polygonal in cross section and positioned upon the said basal member for ready vertical adjustment in any one of a series of different enlargement positions, each of said members being a rigid walled member, said two walled members each being of such vertical extent and so formed and relatively proportioned that in all functioning positions of relative vertical adjustment thereof, said two members extensively overlap and thereby form a double-walled rigid enclosure thereby eliminating jarring distortions in all positions of adjustment thereof, said lower member having an enlarging lens equipment supported therein, and means for maintaining the negative therebelow under pressure against displacement for enlargement purposes, said housing having above the lens structure a movable platen to be brought into contact with the sensitized paper for contact printing, said platen having switch means, an electric circuit for lighting the apparatus, and with which said switch means is functionally connected, and means for operating said platen.

42. As an apparatus for enlarging and for contact printing for photographic purposes from negatives, an upright closed housing consisting of a basal member polygonal in cross section and an upper member similarly polygonal in cross section and positioned upon the said basal member for ready vertical adjustment in any one of a series of different enlargement positions, each of said members being a rigid walled member, said two walled members each being of such vertical extent and so formed and relatively proportioned that in all functioning positions of relative vertical adjustment thereof, said two members extensively overlap and thereby form a double-walled rigid enclosure, thereby eliminating jarring distortions in all positions of adjustment thereof, said housing having an enlarging lens equipment supported therein, means to hold the negative under pressure against displacement below said lens equipment, receiving means located at the top of the housing to hold under pressure the negative and sensitized paper in position for contact printing above said lens equipment, and means for changing the angle of said receiving means to permit the rectification of error in taking the original picture.

43. As an apparatus for enlarging and for contact printing for photographic purposes from negatives, an upright closed housing consisting of a basal member polygonal in cross section and an upper member similarly polygonal in cross section and positioned upon the said basal member for ready vertical adjustment in one of a series of different enlargement positions, each of said members being a rigid walled member, said two walled members each being of such vertical extent and so formed and relatively proportioned that in all functioning positions of relative vertical adjustment thereof, said two members extensively overlap and thereby form a double-walled rigid enclosure, thereby eliminating jarring distortions in all positions of adjustment thereof, said housing having an enlarging lens equipment supported therein, means to hold the negative under pressure against displacement below said lens equipment, receiving means located at the top of the housing to hold under pressure the negative and sensitized paper for contact printing above said lens equipment, and including a movable platen, a handle member for operating said platen, electric lighting means within the housing, automatic switch means connected with the electric light circuit and operated by the movement of the platen, and means for changing the angle of said receiving means to permit of rectification of error in taking the original picture.

44. As an apparatus for enlarging and for contact printing for photographic purposes from negatives, an upright closed housing consisting of a basal member polygonal in cross section and an upper member similarly polygonal in cross section and positioned upon the said basal member for ready vertical adjustment to any one of a series of different enlargement positions, each of said members being a rigid walled member, said two walled members each being of such vertical extent and so formed and relatively proportioned that in all functioning positions of relative vertical adjustment thereof, said two members extensively overlap and thereby form a double-walled rigid enclosure, thereby eliminating jarring distortions in all positions of adjustment thereof, said lower member having an enlarging lens equipment supported therein, means for maintaining the negative under pressure against displacement selectively either below or above the lens equipment, focusing means for said lens equipment, means to operate said focusing means from the outside of the structure, said lens equipment being supported in the housing for ready removal, and cooperating means to hold said lens equipment in said supported position but accessible to permit the release of the lens equipment, so that it can be readily removed from the housing when the apparatus is to be used for printing.

45. As an apparatus for enlarging and contact printing for photographic purposes from negatives, an upright closed housing consisting of a basal member having four upright rigid walls and a similar four-walled rigid member telescopingly positioned upon the basal member for ready vertical movement to different vertical positions, said two walled members each being of such vertical extent and so formed and relatively proportioned that in all functioning positions of relative vertical adjustment thereof, said two members extensively overlap and thereby form a double-walled rigid enclosure, thereby eliminating jarring distortions in all positions of adjustment thereof, an enlarging lens equipment supported for ready removal in and by said basal member, lighting means in said basal member, means accessible at the outside of the housing for manually adjusting the lens, means for selectively maintaining the negative under pressure against displacement either below or above said lens equipment, and adjusting means for varying the angle at which the negative is supported above the said lens equipment, to permit the rectification of error in taking the original picture.

46. As an apparatus for enlarging and contact printing for photographic purposes from negatives, an upright closed housing consisting of a basal member having four upright rigid walls and a similar four-walled rigid member telescopingly positioned upon the basal member for ready vertical movement to different vertical positions, means accessible at the outside of the apparatus for vertically adjusting said upper member upon said basal member, said two-walled members each being of such vertical extent and so formed and relatively proportioned that in all functioning positions of relative vertical adjustment thereof, said two members extensively overlap and thereby form a double-walled rigid enclosure, thereby eliminating jarring distortions in all positions of adjustment thereof, an enlarging lens equipment supported in and by said basal member for ready removal from its position of support in said basal member, means for focusing said lens equipment from the outside of the apparatus, lighting means in said housing, means for supporting the negative by the basal member below the lens equipment, the upper member of the housing having platen means to receive the negative and sensitized paper for contact printing, together with means for changing the angle of said platen means to compensate for distortion in taking the picture.

47. An apparatus for enlarging and for contact printing for photographic purposes from negatives, consisting of a housing containing a lens structure and means for supporting the negative therebelow for enlargement purposes, a ground glass above the lens structure, means accessible at the outside of the housing for focusing the lens equipment without requiring focusing through the ground glass, and means for disconnecting said focusing means whereby said lens structure may be removed from the lower member of the housing when the apparatus is used for contact printing, said housing comprising a lower rigidly walled member polygonal in cross section and an upper member similarly shaped in cross section, being also rigidly walled, said members being mounted in vertically telescoping relation for ready sliding adjustment, said two walled members each being of such vertical extent and so formed and relatively proportioned that in all functioning positions of relative vertical adjustment thereof said two members extensively overlap and thereby form a double walled rigid enclosure, thereby eliminating jarring distortions in all positions of adjustment thereof, said housing having transversely positioned at the top thereof above the lens structure a transparent plate for receiving negatives or sensitized paper, and adjusting means for varying the angle of said transparent plate.

48. An apparatus for enlarging and for contact printing for photographic purposes from negatives, consisting of a housing containing a lens structure and means for supporting the negative therebelow for enlargement purposes, a ground glass above the lens structure, means accessible at the outside of the housing for focusing the lens equipment without requiring focusing through the ground glass, and means for disconnecting said focusing means whereby said lens structure may be removed from the lower member of the housing when the apparatus is used for contact printing, said housing comprising a lower rigidly walled member polygonal in cross section and an upper member similarly shaped in cross section, being also rigidly walled, said members being mounted in vertically telescoping relation for ready sliding adjustment, said two walled members each being of such vertical extent and so formed and relatively proportioned that in all functioning positions of relative vertical adjustment thereof said two members extensively overlap and thereby form a double walled rigid enclosure, thereby eliminating jarring distortions in all positions of adjustment thereof, said housing having transversely positioned at the top thereof above the lens structure a transparent plate for receiving negatives or sensitized paper, adjusting means for varying the angle of said transparent plate, and a platen above and cooperating with said transparent plate.

EDSON S. HINELINE.